United States Patent
Brandauer et al.

[11] Patent Number: 5,725,733
[45] Date of Patent: Mar. 10, 1998

[54] PROCESS FOR PRODUCING FOAM BODIES CONTAINING CELLULOSE-CONTAINING MIXTURES AND FOAM BODIES PRODUCED THEREFROM

[75] Inventors: Edgar Brandauer, Halle; Norbert Habelski, Luppenau/OT Löpitz; Jana Löffler, Unterschobling; Frank Ramhold; Ingwalt Friedemann, both of Halle, all of Germany

[73] Assignee: Schweitzer, Vodermair & Schimmer-Wottrich GBR, Vaterstetten, Germany

[21] Appl. No.: 640,055

[22] Filed: Apr. 30, 1996

[30] Foreign Application Priority Data

May 2, 1995 [DE] Germany .......... 195 15 594.7
Dec. 12, 1995 [DE] Germany .......... 195 46 295.5
Dec. 12, 1995 [DE] Germany .......... 195 46 296.3

[51] Int. Cl.$^6$ .................................. B29B 67/20
[52] U.S. Cl. .................. 162/101; 264/417; 264/420; 264/45.3; 264/53; 264/54; 264/DIG. 69; 521/50; 521/915
[58] Field of Search ............ 264/417, 420, 264/415, 45.3, 53, 54, DIG. 69; 521/915, 50; 162/101

[56] References Cited

U.S. PATENT DOCUMENTS

| | | | |
|---|---|---|---|
| 4,499,036 | 2/1985 | Hawkes, Jr. ........................ | 264/54 |
| 5,106,880 | 4/1992 | Miller et al. ....................... | 521/54 |
| 5,344,595 | 9/1994 | Aoki et al. ........................ | 264/417 |
| 5,368,794 | 11/1994 | Ou ................................ | 264/45.3 |
| 5,395,571 | 3/1995 | Symons ............................ | 264/45.3 |

FOREIGN PATENT DOCUMENTS

| | | |
|---|---|---|
| 546956 | 12/1992 | European Pat. Off. . |
| 3412660 | 10/1985 | Germany . |
| 3420195 | 12/1985 | Germany . |
| 3429682 | 2/1986 | Germany . |
| 3737793 | 5/1989 | Germany . |
| 44 04 322 | 8/1995 | Germany . |
| WO 90/06342 | 6/1990 | WIPO . |
| WO 93/25492 | 12/1993 | WIPO . |

*Primary Examiner*—Mary Lynn Theisen
*Attorney, Agent, or Firm*—Collard & Roe, P.C.

[57] ABSTRACT

A process produces foam bodies having various properties and containing cellulose-containing materials broken up and/or partially broken up and/or not broken up, and additives, if need be. The cellulose-containing starting materials are first processed further for forming a moist pulp and subsequently subjected to a heat treatment by microwave radiation. The properties of the foam bodies so produced are predetermined by admixing certain substances intensifying the formation of gas in the pulp, increasing the adhesive bond between the particles in the pulp, or which completely or partially convert into a gas either under the influence of heat or of moisture, thus supporting the foaming. Furthermore, other residual and waste materials can be added during the production process, which may be materials of a silicate nature as well, preferably with the objective of reusing such materials in a useful way and of predetermining at the same time certain product properties of the foam bodies.

28 Claims, No Drawings

PROCESS FOR PRODUCING FOAM BODIES CONTAINING CELLULOSE-CONTAINING MIXTURES AND FOAM BODIES PRODUCED THEREFROM

BACKGROUND OF THE INVENTION

1. Field of the Invention

The present invention relates to a process for producing foam bodies having various properties, in which the foam bodies contain cellulose-containing substances, and relates to foam bodies produced according to the process.

The invention is directed especially to processing old paper or other broken up or partially broken up, cellulose-containing materials. Paper, cardboard or other cellulose-containing materials are equally suitable as starting materials. These materials can be used either after having been sorted according to quality or as an unsorted raw material mixture.

Preferably, the invention is intended to make a contribution to environmental protection by recovering and treating secondary raw materials which are available in large quantities from several sources.

Furthermore, the invention offers the possibility of incorporating into the composite of solids, if need be, additional materials containing cellulose as well, but being present as a whole and not broken down. In addition, residual and waste materials not containing cellulose may be added as well and in this way may be made available for a useful reuse as well.

The process according to the invention permits the manufacturing of foam bodies which, based on the above-mentioned starting materials, have various properties with respect to strength and porosity or density.

2. The Prior Art

The state of the prior art includes foam bodies made from old paper. It is known that the broken up or partially broken up cellulose-containing starting material can be subjected to a swelling or expansion process or can be directly used in the form in which it is obtained following its breakdown or its partial break-down, and is then subsequently heat treated. Due to the introduction of heat energy, flow paths in the form of hollow spaces are created in the paper pulp by the expanding steam as it escapes therefrom. The body expands and develops a porous structure. Thus, the body volume increases.

Reaction aids which are added are expected to promote the process of volume enlargement. Since the hardening process starts simultaneously in this stage due to the drying of the material, the voluminous porous structure remains at least partly preserved.

SUMMARY OF THE INVENTION

It is an object of the present invention to control the process described above in such a way that foam bodies can be manufactured with a predetermined strength and porosity. In a preferred embodiment, this is to take place within a process in which the required thermal energy is introduced into the aqueous, cellulose-containing starting material by microwave radiation. Such a process is described in detail in DE-OS 44 04 322.

The above object is achieved by providing a process for producing foam bodies having various properties and containing cellulose-containing materials, comprising providing a pulp made of water and a material selected from the group consisting of old paper, old cardboard, and other broken up or partially broken up, cellulose-containing material as a starting mixture material; adding an additive selected from the group consisting of a foaming agent, an expanding agent, a stabilizer, other cellulose-containing materials not broken up, a silicate material, residual and waste material to the cellulose-containing starting mixture material; using each additive jointly or alternatively; said adding taking place in the process at certain times and in defined amounts; and said pulp being later subjected to a thermal treatment.

According to the process of the invention, water and additional substances, or additives, are added to the basic starting materials comprising broken up or partially broken up cellulose-containing material in defined dosage amounts and at certain points in time. These added substances, or additives, can be materials which increase the formation of gas in the slurry (foaming agents), or can be materials which increase the adhesive bond between the particles of the pulp (binders or stabilizers), which are either wholly or partly converted into a gas either under the influence of heat or of moisture and thus support the foaming process (expanding agents), and/or which control the pH of the mixture. Furthermore, cellulose-containing substances which are not broken up and/or residual and waste materials can be used as additional materials. Tests have shown that silicate materials, for example milling powders containing porous concrete, are very well suited to be used as additives. The amount of milling powder ranges from 0% to 40.5% by weight based upon the absolutely dry, cellulose-containing starting material total weight.

Not all of the aforementioned groups of additive materials must necessarily be a component within each formulation, composition, or product. Using different types of representative additives of the respective material groups is simultaneously possible as well.

Another embodiment of the invention relates to the combination of foaming agents, stabilizers (binders), expanding agents and other additives for obtaining a wide variety of different product properties within the foam bodies produced under microwave radiation. In a further embodiment, the addition of the above-mentioned additives can take place within an intensive mixing process.

The cellulose-containing substances not broken up and/or the residual and waste materials including also the silicate materials are added with the proviso that the properties of the foam bodies to be produced are developed to achieve a specified desired result and/or that the additives are drawn from waste disposal and are reused in a useful manner.

A foam body produced according to the process of the invention comprises
 (a) cellulose containing dry mass;
 (b) a tenside;
 (c) a binder stabilizer;
 (d) an expanding agent; and
 (e) a milling powder.

A preferred foam body produced according to the process of the invention comprises
 (a) from 28.3% to 82.0% by weight of cellulose containing dry mass;
 (b) from 0.6% to 2.4% by weight of a tenside;
 (c) from 8.3% to 60.3% by weight of a binder stabilizer;
 (d) from 4.6% to 47.3% by weight of an expanding agent; and
 (e) from 0% to 40.5% by weight of a milling powder;
 wherein each weight is based upon the dry starting material total weight.

The cellulose containing material preferably comprises from 28.3% to 82.0% by weight on a dry basis based upon the total weight of the dry starting material.

The amounts used for each of the aforementioned substance groups can be varied depending on the desired product property to be achieved. The strength and porosity of the foam bodies are influenced particularly by the counter opposing acting forces between the foaming agent and the stabilizing agent. The basic process described is strengthened or weakened by adding different substances belonging to the specified groups of materials, as well as also by the above-described additives. On the process side, the time and the addition of measured amounts of the additional materials are essential to the invention.

Advantageously, tensides or surfactants are used as foaming agents. The effect of such tensides is that the development of gas during the reaction of the expanding agent can be effectively utilized for the formation of foam. The gas and the tenside in the aqueous phase of the cellulose-containing pulp form temporary foam bubbles which effect a residence of the gas within the body until the body size has been stabilized.

Tensides are used in an amount ranging from 0% to 5.0% by weight based on the absolutely dry, cellulose-containing starting material total weight. Preferably the tenside ranges from 0.6% to 2.4% by weight based on the absolutely dry, cellulose containing starting material total weight.

This foaming agent component can be admixed either simultaneously with the water for the expansion of the pulp or following this process step.

Expanding agents such as, for example ammonium carbonate, baking powder, sodium bicarbonate or soda, due to the release of gas during their chemical reaction, either with heating or without the action of heat, effect in cooperation with the foaming agent an expansion of the aqueous pulp mass.

Expanding agents are used in measured amounts ranging from 0% to 200% by weight and preferably from 4.6% to 47.3% by weight based on the total weight of the absolutely dry, cellulose-containing starting material. Expanding agents which cannot be completely converted into a gas without leaving behind a residue leave in the hardened pulp mass a solid residue forming a structure. This solid residue will result in increasing the strength of the foam bodies produced.

Expanding agents achieving their desired results even without heating are admixed immediately prior to the filling of the cellulose-containing material into a mold. Expanding agents acting under the influence of heat can be added jointly with a binder agent, or stabilizer agent.

Suitable examples of a stabilizer agent or binder agent include latex, gypsum, anhydrite, egg white (albumen), protein, starch, soy, flour from grain.

Strongly acting stabilizers or binders increase the bonding forces between the particles of the cellulose-containing pulp and in this way slow down the expansion process of the aqueous pulp mass, such process being caused by the foaming and expanding agents in cooperation with applied heat source such as the microwave radiation.

On the other hand, a weakly acting stabilizer slows down the expansion process only slightly, which leads to voluminous and porous foam bodies having low strength. Stabilizing agents or binders are added in metered amounts ranging from 0% to 200% by weight and preferably from 8.3% to 60.3% by weight based on the total weight of the absolutely dry, cellulose-containing starting material. The stabilizer can be admixed both during the expansion process of the cellulose-containing material and/or during a subsequent mixing process.

Agents influencing the pH are added in an amount such that the desired pH of the aqueous mixture is in the range of 3 to 12. Examples of additives influencing pH include sodium bicarbonate, lime, common salt (NaCl), and salts of sulfuric acid, and are added in a range of from 0% to 15% by weight, preferably from 1% to 10% by weight based on the total weight of the absolutely dry, cellulose-containing starting material.

Especially natural products such as wood or reed grass and products from the agricultural production such as, for example straw, hay, flax or hemp are suitable to use as whole materials which are not broken up. Residual or waste materials either may be of a natural origin or obtained from various production processes. Such materials have to have such characteristics that they are suitable for the respective purpose of application in the foam bodies, for example as packaging material, thermal insulation or sound insulation, or for use in a process for further processing of the foam bodies. Such materials may include viscose fibers, glass fibers or mineral fibers, synthetic fibers, activated carbon, or polystyrene foam. Solid particles of these above materials are uniformly incorporated during the heat treatment into the solid matrix of the cellulose-containing material formed during foaming. It is a precondition that the added materials have been intensively mixed with the other components. If need be, pre-crushing may be required. Depending on the amounts of other materials contained in the starting mixture, for example such as cellulose-containing material, tenside and expanding agent, the cellulose-containing materials not broken up and/or the residual and waste materials are added in measured amounts ranging from 0% to 200% by weight based on the absolutely dry, cellulose-containing starting material. The time of addition, in this connection, is of secondary importance.

For the production of highly porous foam bodies, the mixture of ingredients in the composition formulation is characterized in that a stabilizing agent is either omitted or the materials used from each specified material group cooperate in a way such that solidification occurs at the time of maximum foaming due to the action of the expanding agent and the microwave radiation.

If solid foam bodies are to be produced, the mixture of ingredients in the composition formulation is characterized in that either expanding and foaming agents are completely omitted or the effect of the expanding and foaming agents in combination with the microwave radiation is slowed down by the stabilizer to an extent such that a body with a solid structure and small pores is obtained.

By adding cellulose-containing materials that are not broken up, and/or residual and waste materials which may be of a silicate nature as well, certain properties can be developed in a controlled way especially through selection and amount of the added materials used. If the proportional amount of additives is small, a foam body is obtained which has only slightly changed properties as compared to a foam body produced according to the basic formula. Certain properties such as, for example, the density, the thermal conductivity or the strength can be changed with the increase in content of additives in the product mixture.

As stated above, silicate materials can be used as additives as well. Such materials are, in the form of a finely granular, ground material, added within an intensive mixing process to the pulp of cellulose-containing material, water and the representatives of the specified material groups.

Depending on the amounts of other materials contained in the starting mixture, for example such as cellulose-containing material, stabilizer binder agent and expanding agent, finely granular, crushed silicate material is added in a measured amount ranging from 0% to 200% by weight based on the absolutely dry, cellulose-containing starting material, with such an amount being useful. The time of addition is of secondary importance in this connection.

Products from the building material industry are especially suitable as silicate additives. Tests have shown that milling powder, which is collected as a result of the separation of blocks made of porous concrete, can be used advantageously.

Solid particles of silicate material are uniformly incorporated during the thermal treatment into the solid matrix of cellulose-containing material, such matrix being formed during foaming. A precondition is that the silicate material has been intensively mixed with the other components.

By adding silicate material it is possible to control particularly the strength properties of the foam bodies being produced.

If the component of such material is low, a foam body is obtained which has only slightly changed properties versus the foam body produced according to the basic formula. The porosity of the foam bodies decreases, and the strength and density increase with increasing content of silicate material in the product mixture.

It is known that other properties of the foam bodies such as flame-retardation, hydrophobia, or resistance to bacteria can be controlled by using other additives for such purposes.

DETAILED DESCRIPTION OF PREFERRED EMBODIMENTS

Other objects and features of the present invention will become apparent from the following Examples, which disclose the preferred embodiments of the present invention. It should be understood, however, that the Examples are designed for the purpose of illustration only and not as a definition of the limits of the invention.

In the examples, each weight % is based upon the total weight of the dry starting material.

EXAMPLE 1

The following mixture formulation is suitable for producing a foam body of high strength and elasticity with low density:

| | |
|---|---|
| Cellulose-containing mass (dry) | 34.5% |
| Tenside | 0.6% |
| Binder (albumen) | 28.7% |
| Binder (latex) | 31.6% |
| Expanding agent (baking powder) | 4.6% |

EXAMPLE 2

A formulation consisting of:

| | |
|---|---|
| Cellulose-containing mass (dry) | 28.3% |
| Tenside | 0.8% |
| Binder (albumen) | 23.6% |
| Expanding agent (sodium bicarbonate) | 47.3% | produces a foam body with low strength and low density.

EXAMPLE 3

A foam body containing cellulose-containing materials which are not broken up has the following composition:

| | |
|---|---|
| Cellulose-containing mass (dry) broken up | 41.0% |
| Cellulose-containing mass (dry) not broken up | 41.0% |
| Tenside | 1.1% |
| Binder (soy) | 8.3% |
| Expanding agent (sodium bicarbonate) | 8.6%. |

EXAMPLE 4

A formulation containing silicate comprises:

| | |
|---|---|
| Cellulose-containing mass (dry) | 40.5% |
| Tenside | 2.4% |
| Binder (soy) | 11.9% |
| Expanding agent (sodium bicarbonate) | 4.7% |
| milling powder of porous concrete | 40.5%. |

In connection with the above formulation or composition, water is also added as required. The water content in the respective starting mixtures ranges between 40% and 90% by weight, preferably about 70% by weight, based upon the total weight of the starting mixture.

While several embodiments of the present invention have been shown and described, it is to be understood that many changes and modifications may be made thereunto without departing from the spirit and scope of the invention as defined in the appended claims.

What is claimed is:

1. Process for producing foam bodies having various properties and containing cellulose-containing materials, comprising
   providing a pulp made of water and a material selected from the group consisting of old paper, old cardboard, and other broken up or partially broken up, cellulose-containing material as a starting mixture material;
   adding an additive selected from the group consisting of a foaming agent, an expanding agent, a stabilizer, other cellulose-containing materials not broken up, a silicate material, residual and waste material to the cellulose-containing starting mixture material;
   wherein the starting mixture material contains additives in such an amount that the pH of the mixture is from 3 to 12, and thus is selectively alkaline, neutral or acidic;
   using each additive jointly or alternatively;
   said adding taking place in the process at certain times and in defined amounts; and
   said pulp being later subjected to a thermal treatment.

2. Process according to claim 1, wherein the thermal treatment is by means of microwave radiation.

3. Process according to claim 1, wherein the admixing of said foaming agent occurs either simultaneously with the addition of water for the swelling of the pulp, or after said addition of water.

4. Process according to claim 1, wherein the admixing of said expanding agent which develop this effect without the influence of heat, takes place immediately prior to the filling of the water- and cellulose-containing pulp into a mold.

5. Process according to claim 1, wherein the admixing of said expanding agent which is activated under the influence of heat, takes place jointly with the addition of the stabilizer.

6. Process according to claim 1,
wherein the additives for influencing the pH are already contained in the cellulose-containing starting material and are activated by the breaking up or the partially breaking up of said material.

7. Process according to claim 1,
wherein the additives for influencing the pH are added in measured amounts during the mixing at any desired time.

8. Process according to claim 1,
wherein the additives for influencing the pH are first mixed in an aqueous phase with a stabilizer and a tenside, beaten, if need be, to form a foam, and that the other materials used are subsequently admixed.

9. Process according to claim 1,
wherein the metered addition of the cellulose-containing materials not broken up and/or of the residual and waste materials in a precrushed form with a certain grain size or fiber length is carried out at any desired time by means of an intensive mixing.

10. Process according to claim 1,
wherein said additive influencing pH is selected from the group consisting of sodium bicarbonate, lime, common salt and salts of the sulfuric acid.

11. Process according to claim 1,
wherein water is added in an amount such that the starting mixture contains 40% to 90% by weight of water.

12. Process for producing foam bodies having various properties and containing cellulose-containing materials, comprising
providing a pulp made of water and a material selected from the group consisting of old paper, old cardboard, and other broken up or partially broken up, cellulose-containing material as a starting mixture material;
adding an additive selected from the group consisting of a foaming agent, an expanding agent, a stabilizer, other cellulose-containing materials not broken up, a silicate material, residual and waste material to the cellulose-containing starting mixture material;
wherein said foam agent is at least one tenside in an amount of up to 5.0% by weight based on the absolutely dry, cellulose-containing starting material total weight;
using each additive jointly or alternatively;
said adding taking place in the process at certain times and in defined amounts; and
said pulp being later subjected to a thermal treatment.

13. Process for producing foam bodies having various properties and containing cellulose-containing materials, comprising
providing a pulp made of water and a material selected from the group consisting of old paper, old cardboard, and other broken up or partially broken up, cellulose-containing material as a starting mixture material;
adding an additive selected from the group consisting of a foaming agent, an expanding agent, a stabilizer, other cellulose-containing materials not broken up, a silicate material, residual and waste material to the cellulose-containing starting mixture material;
wherein at least one expanding agent is present in an amount of up to 200% by weight based on the absolutely dry, cellulose-containing starting material;
said expanding agent decomposing into one or several gases completely or with the formation of residual products either under the influence of heat or due to the presence of water;
using each additive jointly or alternatively;
said adding taking place in the process at certain times and in defined amounts; and
said pulp being later subjected to a thermal treatment.

14. Process according to claim 13,
wherein said expanding agent is selected from the group consisting of ammonium carbonate, baking powder, sodium bicarbonate and soda.

15. Process for producing foam bodies having various properties and containing cellulose-containing materials, comprising
providing a pulp made of water and a material selected from the group consisting of old paper, old cardboard, and other broken up or partially broken up, cellulose-containing material as a starting mixture material;
adding an additive selected from the group consisting of a foaming agent, an expanding agent, a stabilizer, other cellulose-containing materials not broken up, a silicate material, residual and waste material to the cellulose-containing starting mixture material;
wherein at least one stabilizer for providing the foam body with a defined strength is contained therein in a metered amount of up to 200% by weight based on the absolutely dry, cellulose-containing starting material;
using each additive jointly or alternatively;
said adding taking place in the process at certain times and in defined amounts; and
said pulp being later subjected to a thermal treatment.

16. Process according to claim 15,
wherein said stabilizer is selected from the group consisting of latex, gypsum, anhydrite, protein, soy, starch and flour from grains.

17. Process according to claim 15,
wherein producing a foam body with high strength, a strongly acting stabilizer is used;
whereas a weakly acting stabilizer is used in view of a foam body to be produced with high porosity.

18. Process for producing foam bodies having various properties and containing cellulose-containing materials, comprising
providing a pulp made of water and a material selected from the group consisting of old paper, old cardboard, and other broken up or partially broken up, cellulose-containing material as a starting mixture material;
adding an additive selected from the group consisting of a foaming agent, an expanding agent, a stabilizer, other cellulose-containing materials not broken up, a silicate material, residual and waste material to the cellulose-containing starting mixture material;
wherein finely granular, crushed silicate material is contained therein in an amount of up to 200% by weight based on the absolutely dry, cellulose-containing starting material depending on the strength of the foam body to be produced;
using each additive jointly or alternatively;
said adding taking place in the process at certain times and in defined amounts; and
said pulp being later subjected to a thermal treatment.

19. Process according to claim 18,
wherein the metered addition of the finely granular, crushed silicate material is carried out during intensive mixing at any desired time.

9

20. Process according to claim 18, wherein milling powder from the production of porous concrete is used as the silicate material.

21. Process for producing foam bodies having various properties and containing cellulose-containing materials, comprising providing a pulp made of water and a material selected from the group consisting of old paper, old cardboard, and other broken up or partially broken up, cellulose-containing material as a starting mixture material;

adding an additive selected from the group consisting of a foaming agent, an expanding agent, a stabilizer, other cellulose-containing materials not broken up, a silicate material, residual and waste material to the cellulose-containing starting mixture material;

wherein the cellulose-containing materials not broken up and the residual and waste materials are, as a whole, contained therein in an amount of up to 200% by weight based on the absolutely dry, cellulose-containing starting material;

using each additive jointly or alternatively;

said adding taking place in the process at certain times and in defined amounts; and said pulp being later subjected to a thermal treatment.

22. Process according to claim 21, wherein natural products selected from the group consisting of wood and reed are used as products not broken up, and agricultural products selected from the group consisting of straw, hay, flax and hemp are used, and that viscose fibers, glass fibers or mineral fibers synthetic fibers, activated carbon or polystyrene foam are used as residual and waste materials.

23. A foam body comprising (a) cellulose containing dry mass;

(b) a tenside;

(c) a binder stabilizer;

(d) an expanding agent; and (e) a milling powder.

24. Foam body according to claim 23, with good strength, a certain elasticity and low density comprising the composition

| (a) cellulose-containing dry mass [(dry)] | 34.5% |
|---|---|
| (b) tenside | 0.6% |
| (c) binder [(protein)] | 28.7% |
| (d) stabilizer [(latex)] | 31.6% |
| (e) expanding agent [(baking powder)] | 4.6% |

10 wherein each weight % is based upon the total weight of the dry starting material.

25. Foam body according to claim 23, with low strength and low density comprising the composition

| (a) cellulose-containing dry mass [(dry)] | 28.3% |
|---|---|
| (b) tenside | 0.8% |
| (c) stabilizer [(protein)] | 23.6% |
| (d) expanding agent [(sodium bicarbonate)] | 47.3% | wherein each weight % is based upon the total weight of the dry starting material.

26. Foam body according to claim 23, comprising cellulose-containing substances not broken up and having the composition

| (a) cellulose-containing dry mass [(dry)] broken up | 41.0% |
|---|---|
| (b) tenside | 1.1% |
| (c) stabilizer [(soy)] | 8.3% |
| (d) expanding agent [(sodium bicarbonate)] | 8.6% | wherein each weight % is based upon the total weight of the dry starting material.

27. Foam body according to claim 23, comprising the composition

| (a) Cellulose-containing dry mass [(dry)] | 40.5% |
|---|---|
| (b) tenside | 2.4% |
| (c) stabilizer [(soy)] | 11.9% |
| (d) expanding agent [(sodium bicarbonate] | 4.7% |
| (e) milling powder of porous concrete | 40.5%. | wherein each weight % is based upon the total weight of the dry starting material.

28. A foam body comprising (a) from 28.3% to 82.0% by weight of cellulose containing dry mass;

(b) from 0.6% to 2.4% by weight of a tenside;

(c) from 8.3% to 60.3% by weight of a binder stabilizer;

(d) from 4.6% to 47.3% by weight of an expanding agent; and (e) from 0% to 40.5% by weight of a milling powder;

wherein each weight % is based upon the total weight of the dry starting material.

\* \* \* \* \*